UNITED STATES PATENT OFFICE.

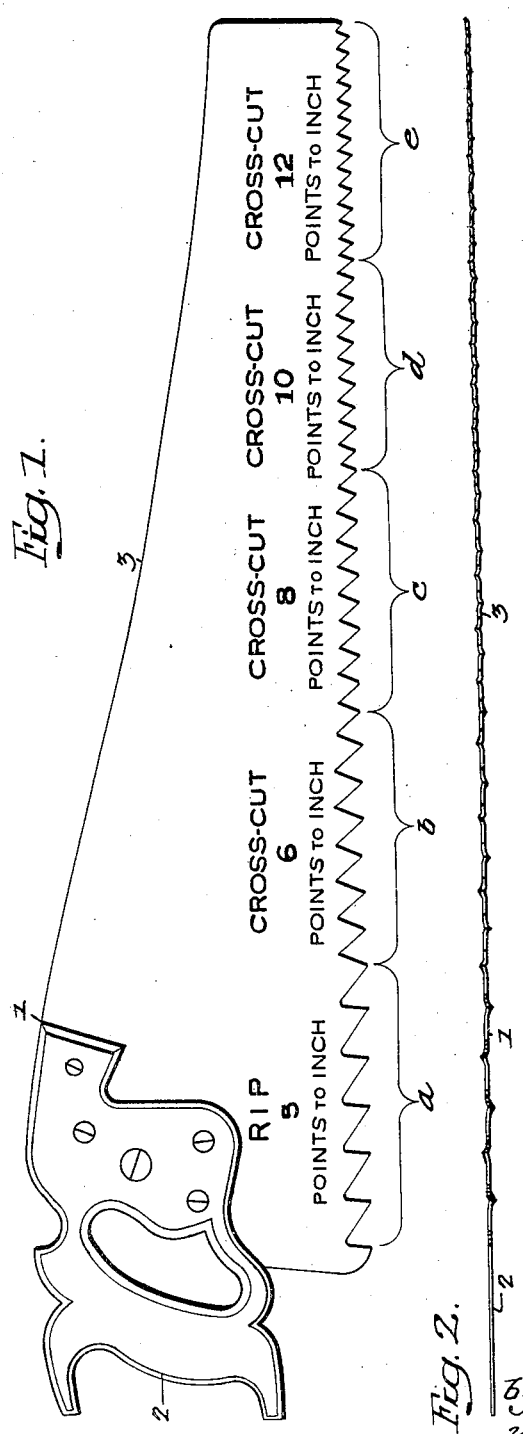

JOHN P. ARNOLD, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

MODEL FOR SETTING AND FILING SAWS.

1,359,216.  Specification of Letters Patent.  Patented Nov. 16, 1920.

Application filed October 11, 1919. Serial No. 330,039.

*To all whom it may concern:*

Be it known that I, JOHN P. ARNOLD, a citizen of the United States, residing in Philadelphia, Pennsylvania, have invented certain Improvements in Models for Setting and Filing Saws, of which the following is a specification.

The object of my invention is to provide a model which will show a carpenter, or other wood worker, the proper method of filing and setting the teeth of wood saws.

This object I attain in the following manner, reference being had to the accompanying drawings, in which:—

Figure 1, is a side view of my improved model for filing the teeth of wood saws; and Fig. 2, is an inverted edge view, showing the set of the teeth.

Wood workers' hand saws are made with teeth of different sizes and the set is extended more or less, depending upon the character of the teeth and the work for which the saw is intended. The teeth of rip saws are made coarse and the set is very extreme so that the saw will clear itself when cutting with the grain; while the teeth of cross cut saws are made much finer and the set is not so great as the set of the teeth of rip saws. Then, again, where the saw is to be used for fine cabinet work in hard woods, the teeth have comparatively little set and they are filed according to certain rules.

Saw makers have great difficulty in repairing saws which have been improperly filed and improperly set, and it is to provide means for instructing the user how to set and file the teeth properly of different grades of saws that I have conceived this present invention.

1 is a flat blade of steel punched, in the present instance, to represent a hand saw, having a handle portion 2 and a blade portion 3. In the present instance, the edge of the blank has a series of teeth $a$, $b$, $c$, $d$ and $e$. The teeth $a$ are similar to the teeth of a rip saw. The teeth $b$, $c$, $d$ and $e$ are similar to the teeth of cross cut saws, having a certain number of teeth to the inch. In the present instance, the coarser teeth are at the widest portion of the blank. The teeth of the section $a$ are set to a greater extent than the other teeth, and the set of the other teeth is graduated according to the size of the teeth. The teeth in the section $e$ have comparatively little set. The teeth of each section are set to the proper degree so that a carpenter, or other wood worker, having a cross cut saw with a certain number of teeth to the inch, can examine this model and find the section which corresponds to the teeth of his saw and set the teeth according to the model. His saw will then be in perfect condition to accomplish the work for which it is intended and the life of the saw will be materially increased.

While I have shown the blank in the form of a saw, it will be understood that the blank may be of other forms, if found desirable, but I prefer to make the blank tapered with the rip saw teeth at the widest portion of the blank.

I claim:—

1. A model for users of wood saws, the same consisting of a blank having a series of toothed sections, the teeth of each section being uniform and differing from those of the other sections and corresponding in form and set to those of a certain type of saw.

2. A model made of sheet metal having at one edge a series of sections of teeth, the teeth of each section differing in size and set, and the angle of filing, from those of the other sections.

JOHN P. ARNOLD.